US008745369B2

(12) United States Patent
Yurzola et al.

(10) Patent No.: US 8,745,369 B2
(45) Date of Patent: Jun. 3, 2014

(54) METHOD AND MEMORY SYSTEM FOR MANAGING POWER BASED ON SEMAPHORES AND TIMERS

(75) Inventors: Damian P Yurzola, Santa Clara, CA (US); Rajeev Nagabhirava, Santa Clara, CA (US); Gary J Lin, San Jose, CA (US); Matthew Davidson, Mountain View, CA (US); Paul A Lassa, Cupertino, CA (US)

(73) Assignee: SanDisk Technologies, Inc., Milpitas, CA (US)

( * ) Notice: Subject to any disclaimer, the term of this patent is extended or adjusted under 35 U.S.C. 154(b) by 267 days.

(21) Appl. No.: 13/296,898

(22) Filed: Nov. 15, 2011

(65) Prior Publication Data
US 2012/0331282 A1    Dec. 27, 2012

Related U.S. Application Data

(63) Continuation-in-part of application No. 13/167,929, filed on Jun. 24, 2011, now Pat. No. 8,694,719.

(51) Int. Cl.
G06F 9/00    (2006.01)
G06F 3/06    (2006.01)
G06F 1/32    (2006.01)
G06F 9/52    (2006.01)

(52) U.S. Cl.
CPC ............ G06F 3/0659 (2013.01); G06F 1/3203 (2013.01); G06F 9/52 (2013.01)
USPC ......................................... 713/100; 713/300

(58) Field of Classification Search
CPC ... G06F 1/3203; G06F 3/0659; G06F 3/0625; G06F 9/52; G06F 13/1668
USPC ................................................... 713/100, 300
See application file for complete search history.

(56) References Cited

U.S. PATENT DOCUMENTS

| 5,661,848 | A  | 8/1997  | Bonke et al. |
| 6,522,580 | B2 | 2/2003  | Chen et al. |
| 6,771,536 | B2 | 8/2004  | Li et al. |
| 6,986,011 | B2 | 1/2006  | Arimilli et al. |
| 7,010,653 | B2 | 3/2006  | Uchida et al. |
| 7,069,394 | B2 | 6/2006  | Arimilli et al. |
| 7,127,573 | B1 | 10/2006 | Strongin et al. |
| 7,334,144 | B1 | 2/2008  | Schlumberger |
| 7,366,832 | B2 | 4/2008  | Lantry et al. |

(Continued)

OTHER PUBLICATIONS

U.S. Appl. No. 13/167,929 entitled, "Controller, Storage Device, and Method for Power Throttling Memory Operations", inventors: Lassa et al., filed Jun. 24, 2011, 40 pages.

(Continued)

Primary Examiner — Thomas Lee
Assistant Examiner — Danny Chan
(74) Attorney, Agent, or Firm — Brinks Gilson & Lione

(57) ABSTRACT

Disclosed are apparatus and techniques for managing power in a memory system having a controller and nonvolatile memory array. In one embodiment, prior to execution of each command with respect to the memory array, a request for execution of such command is received with respect to the memory array. In response to receipt of such request for each command, execution of such command is allowed or withheld with respect to the memory array based on whether such command, together with execution of other commands, is estimated to exceed a predetermined power usage specification for the memory system.

10 Claims, 6 Drawing Sheets

(56) References Cited

U.S. PATENT DOCUMENTS

| | | | |
|---|---|---|---|
| 7,701,764 B2 | 4/2010 | Nguyen | |
| 7,721,011 B1 | 5/2010 | Sutera | |
| 7,724,602 B2 | 5/2010 | Hur et al. | |
| 7,739,461 B2 | 6/2010 | Hur et al. | |
| 7,752,471 B1* | 7/2010 | Kolokowsky | 713/310 |
| 7,907,469 B2 | 3/2011 | Sohn et al. | |
| 2003/0046630 A1 | 3/2003 | Hilbert | |
| 2003/0115476 A1* | 6/2003 | McKee | 713/193 |
| 2003/0225969 A1 | 12/2003 | Uchida et al. | |
| 2004/0267409 A1* | 12/2004 | De Lorenzo et al. | 700/299 |
| 2005/0094665 A1* | 5/2005 | Nalawadi et al. | 370/468 |
| 2006/0112240 A1 | 5/2006 | Walker et al. | |
| 2006/0174151 A1* | 8/2006 | Lin et al. | 713/500 |
| 2007/0159907 A1 | 7/2007 | Kwak | |
| 2007/0294490 A1 | 12/2007 | Freitas et al. | |
| 2007/0294552 A1* | 12/2007 | Kakihara et al. | 713/320 |
| 2008/0040563 A1* | 2/2008 | Brittain et al. | 711/154 |
| 2008/0235441 A1 | 9/2008 | Sherman | |
| 2009/0019243 A1 | 1/2009 | Hur et al. | |
| 2010/0088557 A1 | 4/2010 | Weingarten et al. | |
| 2010/0106889 A1 | 4/2010 | Manning | |
| 2010/0125695 A1 | 5/2010 | Wu et al. | |
| 2010/0146068 A1 | 6/2010 | Haviv | |
| 2010/0146205 A1 | 6/2010 | Baum et al. | |

OTHER PUBLICATIONS

Office Action for U.S. Appl. No. 13/167,929 dated Apr. 17, 2013, 28 pages.

Cho et al., "Peakaso: Peak-Temperature Aware Scan-Vector Optimization", *VLSI Test Symposium*, 2006, Proceedings, $24^{th}$ IEEE, pp. 1-6.

Office Action for U.S. Appl. No. 13/167,929 dated May 29, 2013, 27 pages.

Notice of Allowance for U.S. Appl. No. 13/167,929 dated Oct. 8, 2013, 11 pages.

Notice of Allowance for U.S. Appl. No. 13/167,929 dated Dec. 13, 2013, 7 pages.

Notice of Allowance for U.S. Appl. No. 13/167,929 dated Feb. 4, 2014, 5 pages.

\* cited by examiner

| Commands | Command Semaphore capacity | Command semaphore | Semaphore expiration timer | Semaphore Expiration rate |
|---|---|---|---|---|
| Command #1 | | | | |
| Command #2 | | | | |
| ... | | | | |
| Command #n-1 | | | | |
| Command #n | | | | |

METHOD AND MEMORY SYSTEM FOR MANAGING POWER BASED ON SEMAPHORES AND TIMERS

CROSS REFERENCE TO RELATED PATENT APPLICATION

This is a continuation-in-part of co-pending U.S. patent application Ser. No. 13/167,929, entitled "Controller, Storage Device, and Method for Power Throttling Memory Operations", filed Jun. 24, 2011, by Paul A. Lassa et al., which application is incorporated herein by reference in its entirety for all purposes.

BACKGROUND OF THE INVENTION

This invention relates to methods for managing peak power levels in memory systems, in particular, memory systems that allow parallel operations with respect to multiple memory array (e.g., multi-die and/or multi-die memory systems).

Memory systems generally include multiple components which are in communication with each other and perform different functions as part of an overall system. One example of such a memory system is a nonvolatile memory system. Nonvolatile memory systems are used in various applications. Some nonvolatile memory systems are embedded in a larger system such as a personal computer. Other nonvolatile memory systems are removably connected to a host system and may be interchanged between different host systems. Examples of such removable memory systems (removable memory units) include memory cards and USB flash drives. Electronic circuit cards, including non-volatile memory cards, have been commercially implemented according to a number of well-known standards. Memory cards are used with personal computers, cellular telephones, personal digital assistants (PDAs), digital still cameras, digital movie cameras, portable audio players and other host electronic devices for the storage of large amounts of data. Such cards usually contain a re-programmable non-volatile semiconductor memory cell array along with a controller that controls and supports operation of the memory cell array and interfaces with a host to which the card is connected. Memory card standards include PC Card, CompactFlash™ card (CF™ card), SmartMedia™ card, MultiMediaCard (MMC™), Secure Digital (SD) card, a miniSD™ card, microSD™ card, Memory Stick™, Memory Stick Duo card and microSD/TransFlash™ memory module standards, by way of a few examples. There are several USB flash drive products commercially available from SanDisk Corporation under its trademark "Cruzer®." Other examples of removable memory units include Solid State Drives (SSDs), e.g. using SATA, PCIe, ExpressCard or similar standards. SSDs use solid state memory systems in applications where Hard Disk Drives have traditionally been used, such as in laptop computers.

A solid state drive (SSD) is designed to provide reliable and high performance storage of user data across a flash-based memory system containing a host interface controller (such as a Serial Advanced Technology Attachment (SATA)) interface) and a number of memory multi-chip packages (MCPs), where each MCP contains a flash memory controller and a stack of NAND flash dies. The Open NAND Flash Interface (ONFI) protocol provides support for parallel access to multiple NAND dies (or "logical units" (LUNs)) on a single "target" or NAND multi-chip stack on a single shared ONFI channel. In a typical SATA-based SSD application, a central host controller accesses multiple attached devices (targets/NAND device clusters) on each ONFI channel, and across several ONFI channels. Each ONFI target typically controls 2, 4, or 8 NAND dies. Storage management software running on the host controller manages a virtual memory space that is mapped to flash blocks in the physical dies in each of the attached MCP's.

In many memory systems, storage management software running on the host controller manages a virtual memory space that is mapped to flash blocks in the physical dies in each of the attached MCP's. The host controller and the storage management software utilize parallel access and efficient usage of the available flash devices to optimize SSD drive performance, endurance, and cost. The system often must achieve these optimizations within product-related or technology-related power, which is often set forth in the specifications for the product. For example, in some SSD assemblies, the SSD assembly must not exceed 10 W peak power consumption under any operational mode.

Different techniques have been used to manage power within required limits. For example, the host can employ a host-initiated power management/power-down (HIPM/HIPD) technique in which the host de-powers some number of target modules or directs them to enter a standby/power-down mode. In this way, the host reduces traffic to some number of devices. Improved power management in non-volatile memory systems would be beneficial.

SUMMARY OF THE INVENTION

The present invention is defined by the claims, and nothing in this section should be taken as a limitation on those claims.

In general, apparatus and techniques for managing power in a memory system having a controller and nonvolatile memory array are provided. In one embodiment, prior to execution of each command with respect to the memory array, a request for execution of such command is received with respect to the memory array. Execution of each command is allowed or withheld with respect to the memory array based on whether such command, together with execution of other commands, is estimated to exceed a predetermined power usage specification for the memory system.

In a specific implementation, the memory array is formed within multiple die and/or multiple planes that are accessible in parallel. In a specific aspect, allowing or withholding execution of each command with respect to the memory array is further based on whether such command has a type of command that has been previously executed more than a predetermined threshold number of times. In another aspect, allowing or withholding execution of each command with respect to the memory array is further based on a configurable decision matrix describing necessary delays between execution of each different type of command or a combination of commands.

In another method embodiment, prior to issuing for a component of the memory system a current command having a type, a request for execution of such current command is received at the controller. The controller allows the current command to issue, increments a count for the current command type, and resets a timer associated with the current command type if the count has not reached a predefined semaphore capacity. Otherwise, the controller withholds the current command from issuing if the count for such current command has reached the predefined semaphore capacity and the timer has not expired. The controller resets the count for such current command type if the timer for such current command type has expired.

In a specific implementation, the component (for which the request is received) is a memory cell array and the current command type pertains to programming, reading, or erasing with respect to the memory cell array. In one aspect, the count is reset by subtracting a timer expiration rate from the count. In a further aspect, the expiration rate equals the semaphore capacity. In another embodiment, the type of the current command is determined by comparing the current command to a plurality of command type values.

In another embodiment, the invention pertains to memory system having a nonvolatile memory array for storing data, a flash protocol sequencer (FPS) for accessing the memory array and prior to such accessing, requesting permission from a power arbitration unit to access such memory array, and the power arbitration unit (PAU). The PAU is configured for allowing or withholding permission to the FPS for accessing the memory array. The PAU is configured to determine whether to allow or withhold based on whether such command, together with execution of other commands, is estimated to exceed a predetermined power usage specification for the memory system. In further embodiments the PAU is configured to perform one or more of the above described method operations. In another embodiment, the memory system comprises a nonvolatile memory array for storing data and a controller that is operable to perform one or more of the above described power arbitration method operations.

These and other features of the present invention will be presented in more detail in the following specification of embodiments of the invention and the accompanying figures, which illustrate by way of example the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

The following embodiments are directed to techniques for meeting power limits of a storage system, while providing better performance. In general, the memory storage system includes a power arbitration unit (PAU) that is configured to provide power arbitration for commands that utilize power. The PAU receives a request to allow issuance for each command (or set of commands). For example, the PAU receives a write or read command request prior to execution of such command with respect to the memory array of the storage system. The PAU allows or withholds permission for execution of such command with respect to the memory array based on whether such command, together with execution of other commands, has been estimated to exceed a predetermined power usage specification for the memory system. For instance, the PAU may only allow a certain number of a particular command type (or combination of command types) to be executed in parallel.

Figure 1:
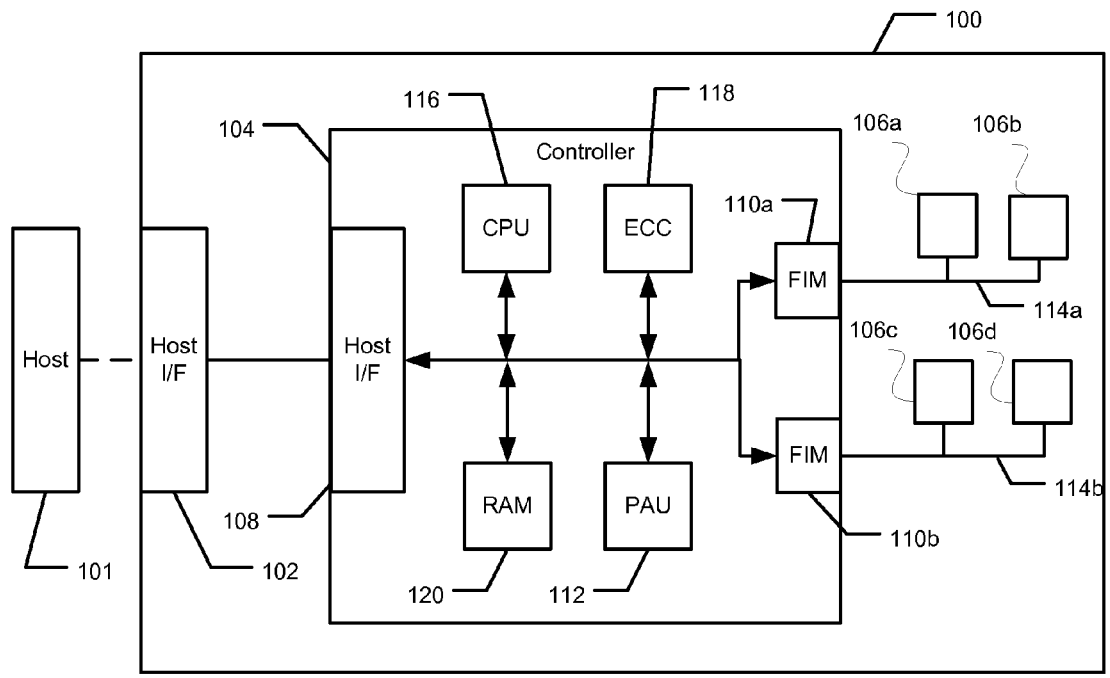
FIG. 1 shows an example of a memory system in accordance with one embodiment of the present invention.

Before turning to the details of PAU embodiments of the present invention, exemplary memory system architectures will first be described. FIG. 1 shows an example of memory system 100 in accordance with one embodiment of the present invention. The memory system includes a host interface 102, a memory controller 104, and a memory array in the form of one or more memory array dies, e.g., 106a-106d. An outer casing may be formed around these components so as to provide protection to such components from physical damage. The memory system may include other components (such as light emitting diodes, LEDs) for additional functionality.

The memory controller 104 is in communication with a host interface 102 that provides a connection to a host 101, which is, for example, a digital camera, laptop computer, MP3 player, PDA, or other similar electronic device. In certain implementations, the host interface 102 complies with a standard (such as a memory card standard or the USB standard) so that the memory system can interface with a wide range of hosts that have a corresponding interface. Typically, such standards provide for the physical arrangement of pins in the physical interface as well as the assignment of each pin, voltage levels used, as well as the protocols used for data and commands sent through the interface. Many interfaces include a provision for a host to provide power to a memory system. For example, memory cards and USB flash drives can obtain their power from a host through such a host interface.

The memory controller 104 is also in communication with four memory array chips 106a-106d over memory buses 114a and 114b. In the illustrated example, the controller 104 also includes a plurality of memory interfaces, such as Flash Interface Module (FIMs) 110a and 110b. Each FIM is coupled with a different memory bus that is coupled to a different set of memory dies. For instance, FIM 110a is coupled with memory dies 106a and 106b via memory bus 114a, and FIM 110b is coupled with memory dies 106c and 106d via memory bus 114b. Memory controller 104 also includes host interface 108, which is connected to the host interface 102 of the memory system 100.

The arrangement of FIG. 1 may facilitate higher speed access to the memory array by allowing a higher degree of parallelism. Both FIM's may transfer data in parallel to different sets of memory dies, thus doubling the speed of transfer for a given bus size. In one example, each memory bus has a bus width of 16 bits, so that using two such busses in parallel provides the equivalent of a 32 bit wide bus, but without requiring memory chips that are designed for 32 bit access (i.e. cheaper memory chips with 16 bit access may be used). Additionally, a higher degree of parallelism may be achieved due to a higher level of concurrency of operations being executed within the different memory dies, planes, etc.

The memory controller 104 may also be configured to manage data in the memory array. When a host sends data, the memory controller 104 can be operable to determine where the data is to be stored and record the location where such data is stored. In one example, the memory controller performs logical-to-physical mapping so that data received from the host with logical addresses is mapped to physical locations in the memory array in a manner that is determined by the memory controller according to the available space in the memory array.

The memory controller 104 may also include one or more Error Correction Code (ECC) modules, e.g., 118. Host data can be transferred between the memory controller and the flash memory array via FIMs 110a and 110b, which temporarily store such data in buffer RAM 120. A FIM can be configured to detect data errors on the fly during this process. If no errors are detected, the data can be transferred to the host via host interface modules 108 and 102. If errors are detected, ECC circuit 118 could be utilized to correct such errors before transferring the data to the host. Such ECC functions allow errors in data that are read from the memory array 106 to be corrected in the memory controller 104 before the data is sent to the host 101. In certain embodiments, the controller 104 may include any suitable number of ECC modules for writing and reading data to and from the memory array via one or more of the FIMs. That is, each FIM may have its own ECC module, or a single ECC module (118, as shown) may interface with a plurality of FIMs.

The memory controller 104 can take the form of any combination of hardware and software, such as a dedicated chip or Application Specific Integrated Circuit ("ASIC"), which is separate from the nonvolatile memory chips. The memory controller 104 may also include any number and type of circuits for performing the various functions of the controller. For instance, the controller 104 may also include one or more microprocessors 116 and buffer RAM 120. A microprocessor 116 can be configured to provide overall control of the ECC circuit 118, host interface module 108, and flash interface modules 110a and 110b, as well as other components of memory controller 104. The buffer RAM 120 may provide temporary storage of data that is being transferred between the host 101 and memory array, as well as other data for operation of the controller 104.

The memory array may take the form of a nonvolatile NAND flash memory array. Alternatively, the nonvolatile memory array may take the form of one-time-programmable (OTP) memory, NOR flash memory, Magnetic Random Access Memory (MRAM), or other form of nonvolatile memory. The nonvolatile memory array may be located in a plurality of chips as shown. Each chip may include read and write circuits and other peripheral circuits.

Alternative memory systems may include any suitable number and type of controllers, interfaces, buses, and/or memory dies. Several memory system architectures are described in U.S. patent application Ser. No. 13/167,929, entitled "Controller, Storage Device, and Method for Power Throttling Memory Operations", filed Jun. 24, 2011, by Paul A. Lassa et al., which application is incorporated herein by reference in its entirety for all purposes.

In a multi-die memory system, particularly multi-bank-multi-die systems, there is a very high chance that power consuming operations at the memory array overlap in time. As a result, windows of very high peak power can be created. Execution of other types of commands, besides commands that are executed with respect to the array, also consume power.

The memory system of the present invention also includes a power arbitration unit (PAU) that is configured to manage power with respect to a plurality of commands. The PAU embodiments of the present invention may be integrated into any type of memory system architectures, such as the architectures described herein, including descriptions incorporate herein. Overall, a PAU may be implemented by any suitable combination of hardware and/or software. Although the embodiments illustrated herein show the PAU as being part of the memory controller, the PAU can be a separate module from the controller or formed within any suitable logic block of the memory system.

Figure 2A:
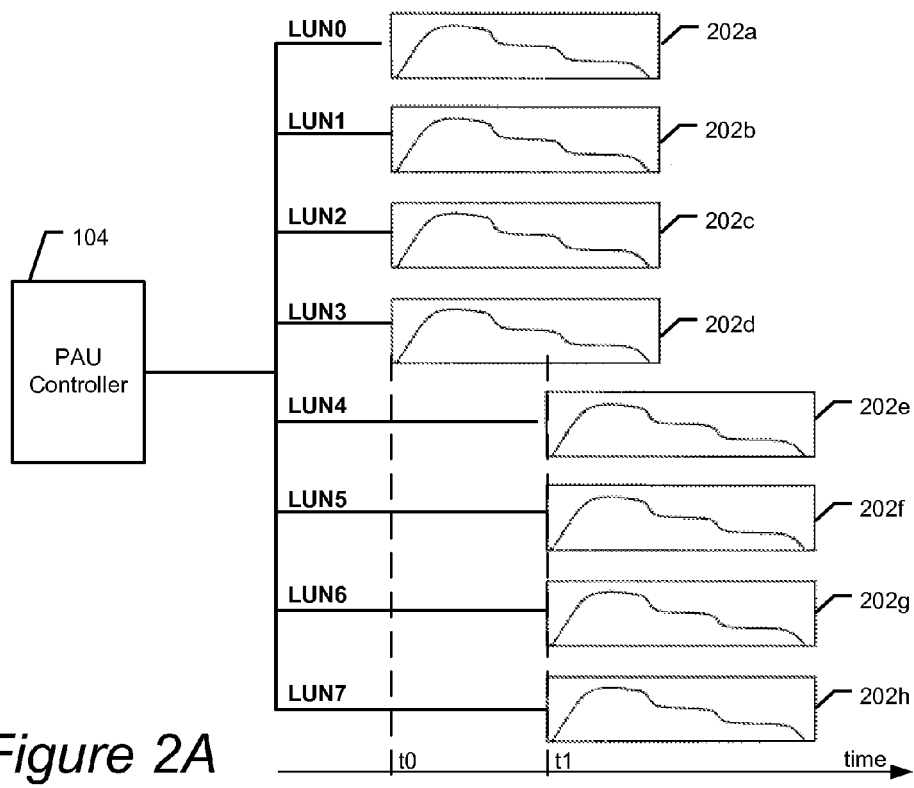
FIG. 2A illustrates the operation of a Power Arbitration Unit (PAU) controller configured to implement data transfer operations with respect to logical units of a memory array so as to minimize peak power overlap in accordance with one example embodiment.

The PAU may operate to cause the time periods of peak power for a predefined number of commands of a certain type stacked together and executed in parallel, while the execution of a subsequent command of the same type is delayed. FIG. 2A illustrates a PAU controller 204 that is configured to implement data transfer operations with respect to logical units (LUNs) LUN0-LUN7 over time so as to minimize peak power overlap. At time t0, PAU controller 204 allows data transfer operations for LUN0-LUN3 to execute, while delaying execution of data transfer operations for LUN4-LUN7 until time t1. As a result, the peak power durations between t0 and t1, as shown in the power profiles 202a-202d for LUN0-LUN3, will not significantly overlap with the peak power durations of power profiles 202e-202h for LUN4-LUN7.

Figures 2B, 3:
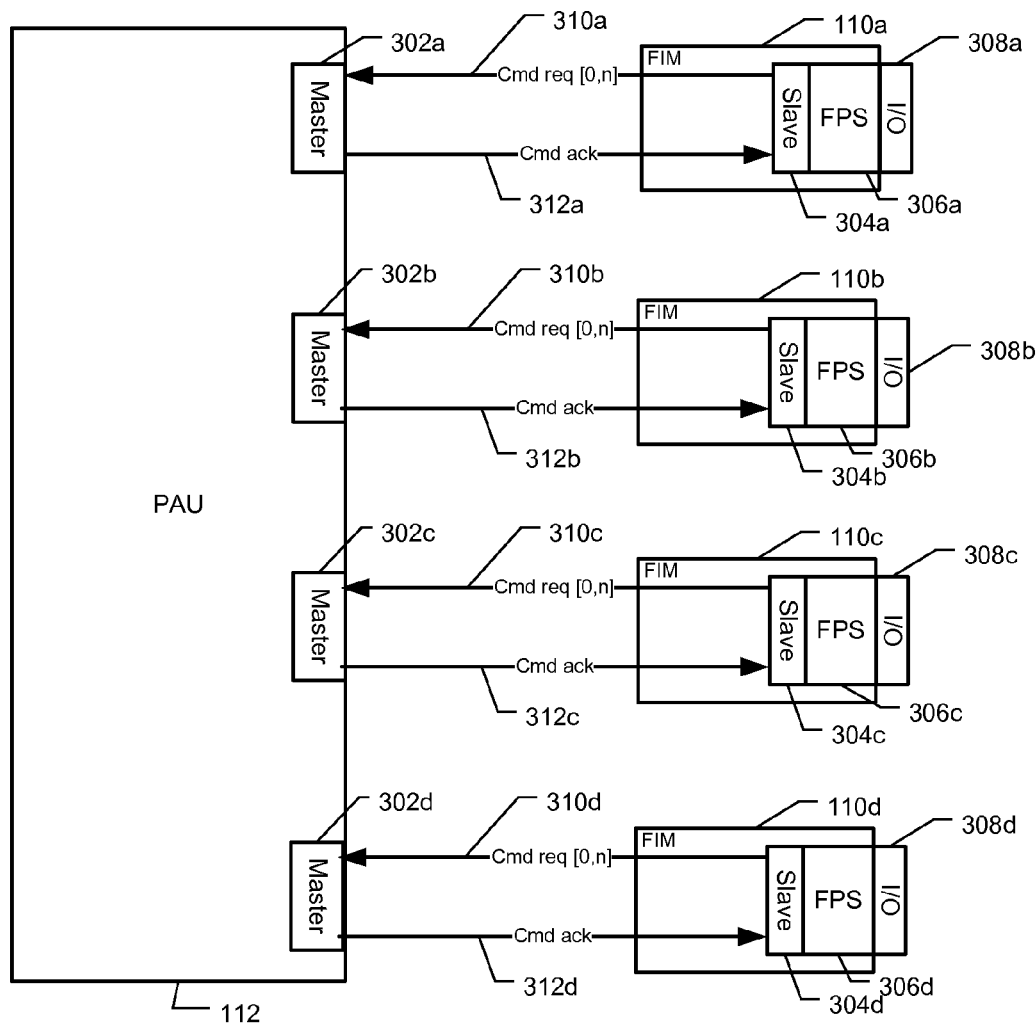
FIG. 2B shows a table of predefined semaphore information that is used during power arbitration in accordance with a specific implementation.
FIG. 3 is a diagrammatic representation of an interface between a power arbitration unit (PAU) and a plurality of flash interface modules (FIM) in accordance with one embodiment of the present invention.

The PAU may be configured with any suitable data for facilitating power arbitration with respect to particular types of commands (or sets of commands). FIG. 2B includes a table 220 of predefined semaphore information that is used during power arbitration in accordance with a specific implementation. As shown, each command type has a plurality of associated semaphore fields: a command semaphore capacity, a command semaphore, a semaphore expiration timer, and a semaphore expiration rate. The PAU may be operable to utilize these semaphore values to determine whether to allow or inhibit issuance of a particular command type of set of command types as described further below.

The semaphore capacity generally indicates how many times the associated command type can issue or execute before further issuance is to be inhibited by the PAU. By way of example in some systems, a particular command type may be allowed to issue four times, but the fifth command for the same type may be inhibited so as to not cause the memory system's power usage to exceed the peak power budget. The command semaphore value indicates how many commands of the associated type have been allowed to issue or execute, e.g., within a specified time frame. In the previous example, the command semaphore value increments each time a command for the associated type is executed. When the command semaphore for a particular command type reaches the command semaphore capacity, the next request for the same command type has to be withheld.

The semaphore expiration timer indicates the maximum amount of time that can pass since the last issued command for the particular type. After the expiration timer has been met, the currently withheld request or next request can be granted without delay. If a request is pending and the expiration timer value has not been met, such request is granted as soon as the command semaphore becomes less than the command semaphore capacity. The semaphore expiration rate indicates the number of semaphore units or counts that are restored whenever the semaphore expiration timer value is reached. In one embodiment, the semaphore expiration rate is subtracted from the command semaphore after the time has expired after the last command. For example, if a write command can only be issued four times after which the fifth write command is held, the fifth write command is allowed to issue after the expiration time and the current semaphore will be reset to zero if the expiration rate is 4. Of course, it is not necessary to have the expiration rate be equal to the semaphore capacity value. For example, the expiration rate can equal 1, while the capacity equals 4. In this later example, four commands could issue at once (e.g., for LUN0~LUN3), and then subsequent commands would be staggered (e.g., for LUN4~LUN7).

The data for facilitating power arbitration may take any suitable form and contain any suitable values for efficiently limiting power consumption for a particular device. For example, the power facilitation data may be fixed to values that are determined to work best for the particular type of memory system, e.g., based on the devices specification limits and/or experimentation results. Alternatively, the power facilitation data may be selectively alterable as power needs change, e.g., as the device ages. Additionally, other types of data, such as power units, may be associated with and tracked for each type of command. The power units may then be added for simultaneously executing commands until a power limit is reached, after which command execution is deferred.

Figure 2C:
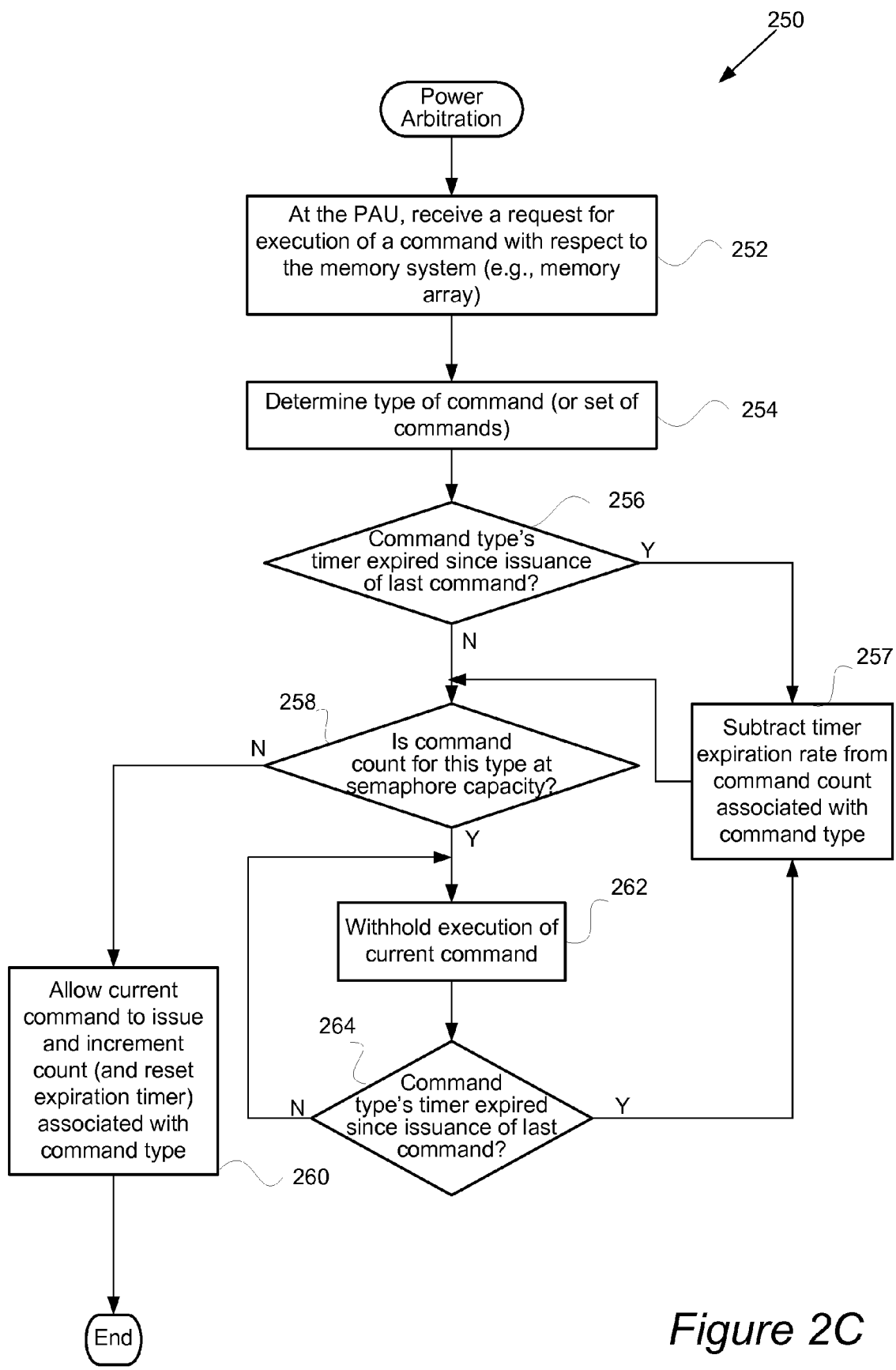
FIG. 2C is a flow chart illustrating a procedure for performing power arbitration with respect to various types of commands in accordance with a specific implementation of the present invention.

FIG. 2C is a flow chart illustrating a generalized procedure 250 for performing power arbitration with respect to various types of commands in accordance with a specific implementation of the present invention. Initially, a request for execution of a command with respect to the memory system may be received at the PAU in operation 252. For example, a command for programming the memory array is received from a particular FPS module.

The type of command (or set of commands) can then be determined in operation 254. For instance, a particular field of a received command is compared to a list of command type values that correspond to different command types, such as a program, read, etc. In a further embodiment, the PAU may accumulate commands until a particular combination of command types for executing together are received.

It may then be determined whether the command type's (or command combination type's) corresponding timer has expired since issuance of the last command for this particular type in operation 256. For example, enough time may have passed for the previous command of the same type (as well as all concurrently commands and any other commands executed before the last command of the same type) to have executed completely or, at least, finished with the period of time for peak power usage. If the timer has expired, the timer expiration rate value may be subtracted from the command count associated with this command type in operation 257. For example, if the expiration rate is 4 and the current count has reached semaphore capacity of 4 and the expiration timer has expired, the current count is reset to zero. If the expiration timer has not expired, this operation for resetting the count is skipped.

After the expiration timer is reset or if it is determined that the timer has not expired yet, it may then be determined whether the command count for this type has reached the semaphore capacity in operation 258. For example, if the semaphore capacity for a current command having a "write" type is 4, it is determined whether 4 "write" commands have already issued. If the semaphore capacity has not been reached, the current command (or combination of commands) may be allowed to issue and the current count for this command type is incremented (and the expiration timer may be reset) in operation 260. The arbitration process may then end for the particular command until another command is received.

If the command count has reached its capacity, execution of the current command may be withheld in operation 262. It then may be again determined whether the command type's timer has expired since issuance of the last command in operation 264. The procedure may wait for expiration of the timer, after which the timer expiration rate is subtracted from the current count and cause such count to fall below the semaphore capacity value. This count reset will then cause the withheld current command to be issued in operation 260.

By monitoring and limiting the "power cost" of the commands on a command-by-command basis, the PAU is able to dynamically (e.g., on the fly) alter when each of the commands is performed so that performance of the commands in the aggregate does not exceed power limits over a period of time, e.g., as set forth in the specifications of the storage device. Because it is the storage device's PAU, and not a host processor, that facilitates power regulations, these embodiments can be used with multi-chip packages (MCP) (e.g., a controller and N number of LUNs) that serve multiple host processing instances that are unaware of each other. For example, a host may be running four independent instances of a flash memory management application, where one or two LUNs on a four or eight LUN MCP are allocated or dedicated to each of the instances. In this case, each independent instance of the flash memory management knows how much and what kind of traffic it is sending, but it does not know what the other three instances are sending. Centralizing power regulation control in a PAU of the MCP overcomes this problem.

Any suitable hardware and/or software may be configured to implement the PAU techniques described herein. FIG. 3 is a diagrammatic representation of an example interface between a PAU 112 and a plurality of FIM's 310a-110d. The PAU 112 may include a plurality of master modules 302a-302d, and the master modules are operable to interface with a plurality of slave modules 304a-304d of the FIM's 110a-110d. A plurality of flash protocol sequencer (FPS) modules 306a-306d of the FIM's can also provide an interface between the slave modules and a plurality of I/O modules 308a-308d, which are communicatively coupled to the memory array (not shown).

Each FPS may be configured to implement the commands with respect to the memory array, e.g., NAND array, or, more specifically, a set of associated memory array dies. That is, each FPS may serve multiple array dies. In one implementation, each FIM can concurrently execute multiple process threads for accessing the multiple dies or banks of memory array via its associated FPS module. For instance, each FIM may be configured to forward a plurality of commands to its associated FPS for execution in parallel with respect to a plurality of associated memory array dies and/or banks After permission is granted by the PAU for one or more commands, the FPS may then generate the appropriate memory array signals for the permitted commands with respect to its associated memory array, as further described below.

In general, each master module of the PAU may provide a pass-through feature so as to transmit command requests and acknowledgement responses between each respective FPS module and the PAU. The number of master modules may depend on the number of FPS modules, for example, with a master module being provided for each FPS module. This arrangement provides easy scaling for additionally memory dies and their associated FIM modules to be easily instantiated.

Figure 4:
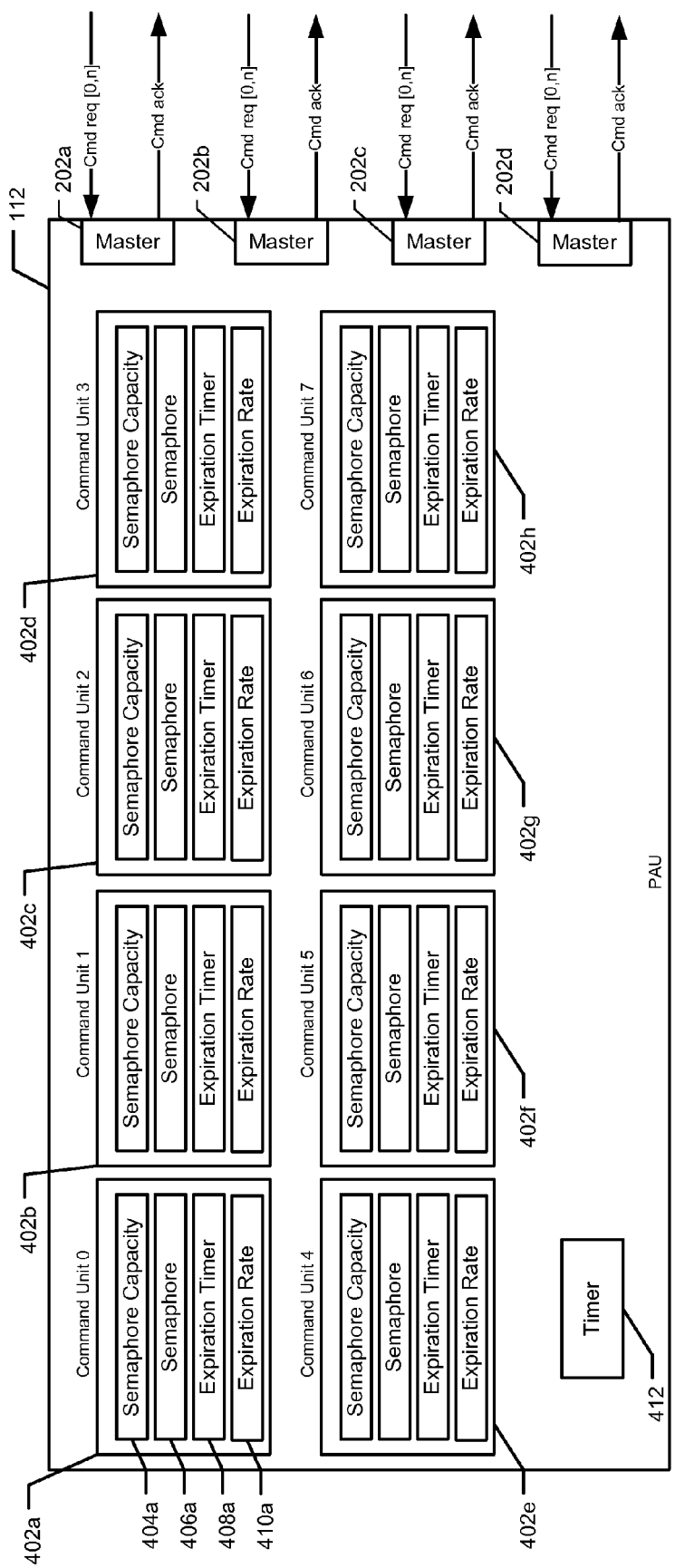
FIG. 4 is a diagrammatic representation of a PAU module in accordance with one implementation of the present invention.

FIG. 4 is a diagrammatic representation of PAU module 112 in accordance with one implementation of the present invention. The PAU may include a plurality of command unit modules 402a-402h for storing data for facilitating power arbitration. In this illustrated embodiment, each command unit module contains a plurality of fields for each command type or set of commands. For example, command unit 402a includes a semaphore capacity field 404a, a semaphore field 406a, an expiration timer field 408a, and an expiration rate field 410a. The PAU may also include one or more timers, e.g., 412, as well as one or more master interfaces, e.g., 202a-202d.

Figure 5:
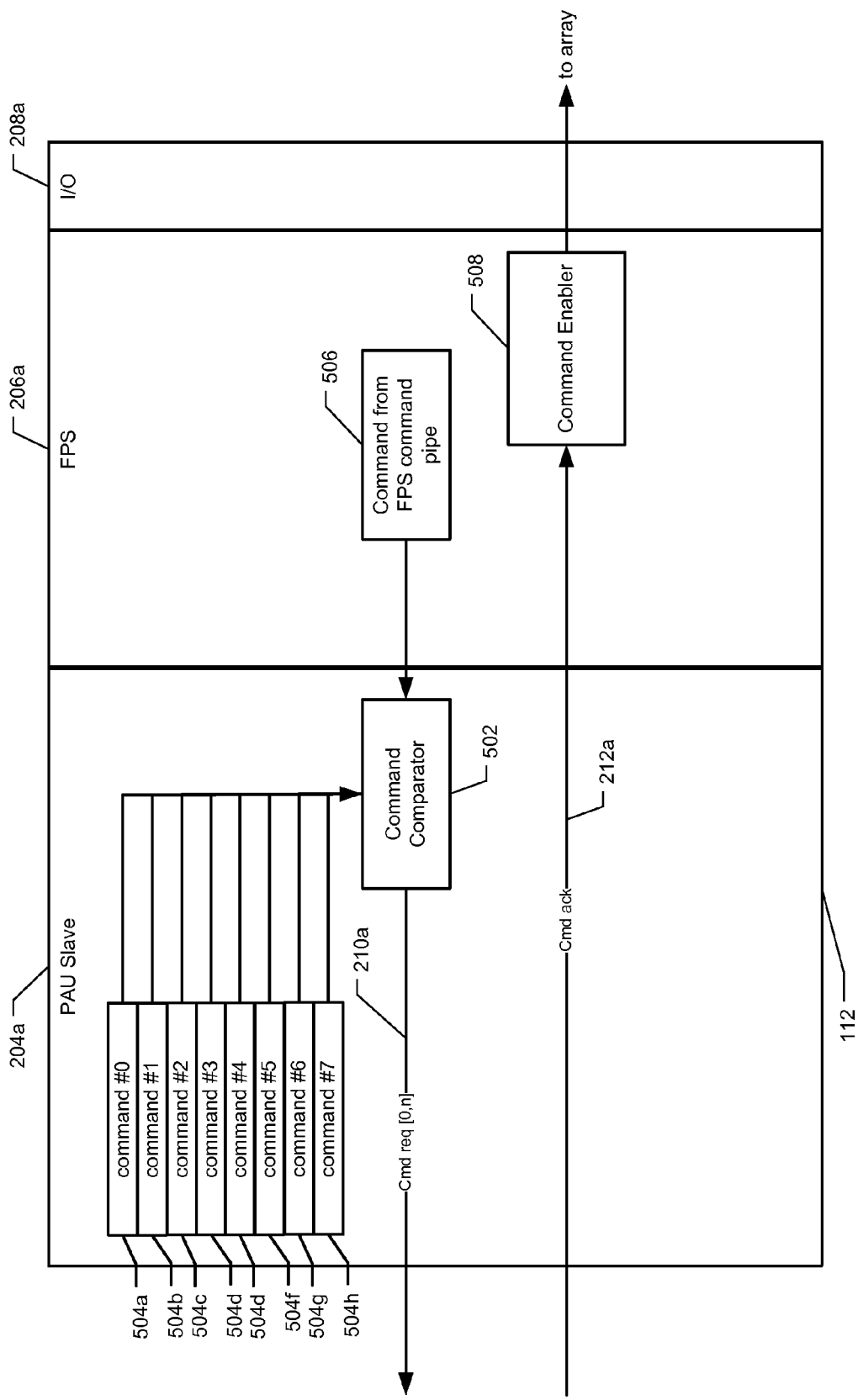
FIG. 5 illustrates one example of a PAU slave and an FPS module and I/O interface in accordance with a specific implementation.

FIG. 5 illustrates one example of a PAU slave 204a and an FPS module 206a and I/O interface 208a in accordance with a specific implementation. The PAU 112 may include any suitable number and type of registers for holding variables or constants for operation of power arbitration for particular command types. As shown, the PAU slave 204a may include a plurality of command type registers 504a-504h. Each command type register specifies or describes a particular command type, e.g., write, read, etc.

The PAU may also include a command comparator 502. The command comparator 502 may receive a command from an FPS command pipe 506, for example, of FPS 206a. The command comparator 502 may operate to compare the received command to information in the plurality of command registers 504a-504h so as to determine the particular type of command. The command comparator may then output a command request 210a having the particular determined command type. The command request 210a may be any suitable width, depending on the number of commands that are to be distinguished. In the illustrated example, the command request 210a is eight bits wide.

By way of example, a command register #0 may specify the command number for a particular command type that is used by the comparator to compare against the received command to determine whether the received command is in the list of arbitrated commands.

The command request is transmitted to the PAU master of the PAU module, which determines whether to allow or not allow the particular command request to proceed. If the PAU module determines that a particular command request is to proceed, the PAU module can then return a command acknowledgment (ACK) 212a to the FPS 206a via the respective slave module 204a. The command ACK 212a may be received by a command enabler 508, for example, of the FPS 206a. The command enabler 508 of the FPS 206a can generally operate to issue the particular command type, e.g., programming, reading, or erasing a plurality of cells within the memory array, via a I/O interface 208a.

In embodiments in which power arbitration is applied to the memory array, the command enabler 508 issues a command to the array using any suitable combination of hardware and software. For example, a NAND type memory cell array having a plurality of storage units M arranged in a matrix may be controlled by various types of hardware or software modules, such as a column control circuit, a row control circuit, a c-source control circuit, and a c-p-well control circuit. In this embodiment, the column control circuit is connected to bit lines (BL) of the memory cell array for reading data stored in the memory cells (M), for determining a state of the memory cells (M) during a program operation, and for controlling potential levels of the bit lines (BL) to promote the programming or to inhibit the programming. The row control circuit is connected to word lines (WL) to select one of the word lines (WL), to apply read voltages, to apply a program voltages combined with the bit line potential levels controlled by the column control circuit, and to apply an erase voltage coupled with a voltage of p-type regions (labeled as "c-p-well" in FIG. 6) on which the memory cells (M) are formed. The c-source control circuit controls the common source lines (labeled as "c-source" in FIG. 6) connected to the memory cells (M). The c-p-well control circuit controls the voltage of the c-p-well.

Other types of modules may also be implemented for various array operations, such as data I/O buffers for input and output of data to and from the array, a command interface for receiving command data for controlling the memory array from the external I/O lines from a respective FPS, one or more state machines for controlling various memory array modules (e.g., the column control circuit, the row control circuit, the c-source control circuit, the c-p-well control circuit, and the data I/O buffer) and for outputting status data of the flash memory, such as READY/BUSY or PASS/FAIL.

Figure 6:
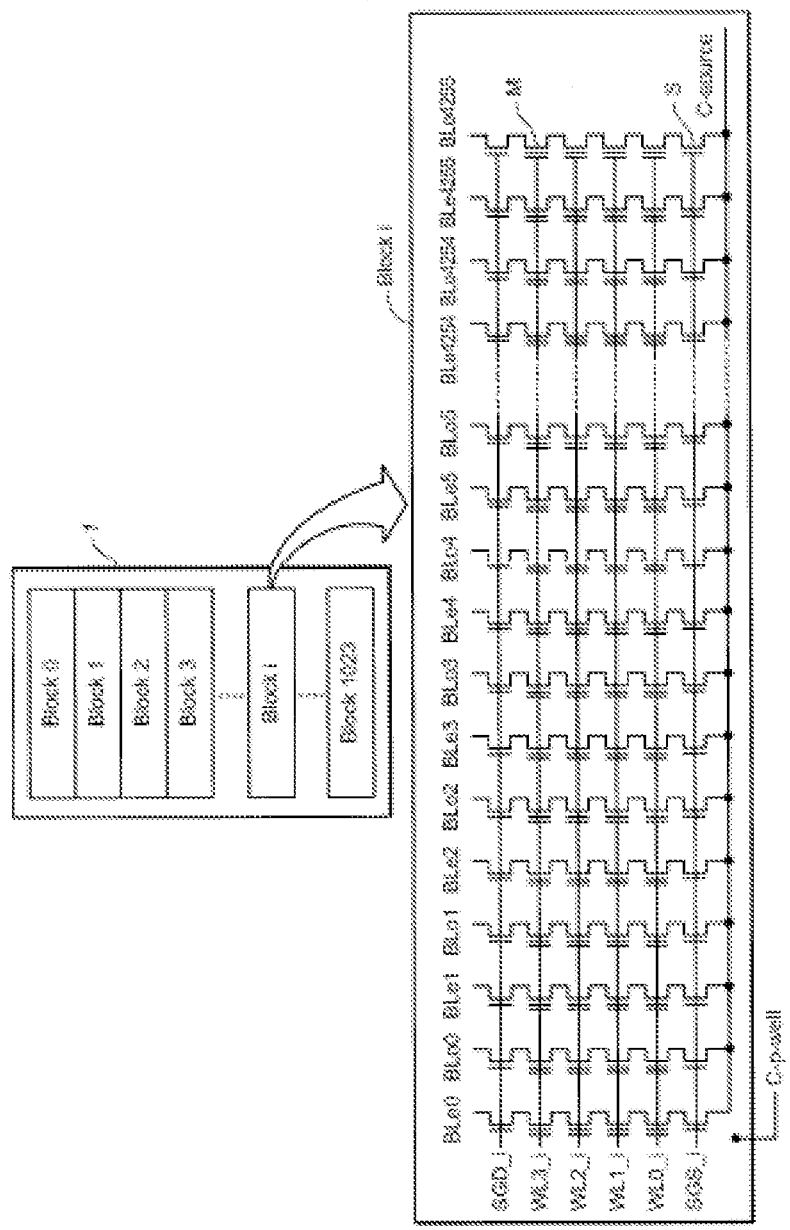
FIG. 6 is a diagrammatic representation of an example structure of a memory cell array.

With reference to FIG. 6, an example structure of a memory cell array is briefly described. A flash EEPROM of a NAND type is described as an example. The memory cells (M) are partitioned into a number of blocks, 1,024 in a specific example. The data stored in a particular block are simultaneously erased. In this implementation, the block is the minimum unit of a number of cells that are simultaneously erasable. In each block, there are N columns, N=8,512 in this example, that are divided into left columns and right columns, as described in further U.S. Pat. No. 6,522,580, which patent is incorporated by reference herein. The bit lines are also divided into left bit lines (BLL) and right bit lines (BLR). Four memory cells connected to the word lines (WL0 to WL3) at each gate electrode are connected in series to form a NAND cell unit. One terminal of the NAND cell unit is connected to corresponding bit line (BL) via a first select transistor (S) which gate electrode is coupled to a first (Drain) select gate line (SGD), and another terminal is connected to the c-source via a second (Source) select transistor (S) which gate electrode is coupled to a second select gate line (SGS). Although four floating gate transistors are shown to be included in each cell unit, for simplicity, other numbers of transistors, such as 8, 16, 32 or even 64 or more, are used. In some memory systems more than 8,512 columns (bit lines) may be provided, for example 67840 columns. FIG. 6 also includes a connection, C-p-well, for supplying the well voltage.

In each block, in this example, 8,512 columns are divided into even columns and odd columns. The bit lines are also divided into even bit lines (BLe) and odd bit lines (BLo). Four memory cells connected to the word lines (WL0 to WL3) at each gate electrode are connected in series to form a NAND cell unit. One terminal of the NAND cell unit is connected to corresponding bit line (BL) via a first select transistor (S) which gate electrode is coupled to a first select gate line (SGD), and another terminal is connected to the c-source via a second select transistor (S) which gate electrode is coupled to a second select gate line (SGS). Although, for simplicity, four floating gate transistors are shown to be included in each cell unit, a higher number of transistors, such as 8, 16 or even 32, are used.

In an alternate set of embodiments, as described in U.S. Pat. No. 6,771,536, which is herein incorporated by reference, the array can be divided into left and right portions instead of the odd-even arrangement. The left and right sides may additionally have independent well structures with the right and left sides of the array each formed over such separate well structures, allowing the voltage levels to be set independently by the c-p-well control circuit. In a further variation, this could also allow erasure of a sub-block of less than all of the partitions of a block. Further variations that are compatible with the present invention are also described in U.S. Pat. No. 6,771,536.

In the exemplary embodiments, the page size is 512 bytes, which is smaller than the cell numbers on the same word line. This page size is based on user preference and convention. Allowing the word line size to correspond to more than one page's worth of cells saves the X-decoder (row control circuit 3) space since different pages worth of data can share the decoders. During a user data read and programming operation, N=4,256 cells (M) are simultaneously selected in this example. The cells (M) selected have the same word line (WL), for example WL2, and the same kind of bit line (BL). Therefore, 532 bytes of data can be read or programmed simultaneously. This 532B data simultaneously read or programmed forms a "page" logically. Therefore, one block can store at least eight pages. When each memory cell (M) stores two bits of data, namely a multi-level cell, one block stores 16 pages in the case of two bit per cell storage. In this embodiment, the storage element of each of the memory cells, in this case the floating gate of each of the memory cells, stores two bits of user data.

Regardless of the particular memory configuration, the controller can be connected or connectable with a host system, such as a personal computer, a digital camera, or a personal digital assistant. The host can initiate commands, such as to store or read data to or from the memory array, and provide or receive such data, respectively. In general, an FPS of the controller converts such commands into command signals that can be interpreted and executed by the command circuits of the array. However, the FPS only converts such commands to signals after receiving permission from the PAU.

Although the power arbitration techniques are mostly described herein in relation to controlling a memory array via its various control hardware and software, the arbitration techniques may also be used to control power with respect to commands issued for other components of the memory system, which are sources of high power consumption, such as ECC (error correction code) and AES (advanced encryption standard) engines. The PAU may also or alternatively be configured to interface with various command modules of these other components.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

What is claimed is:

1. A method for managing power in a memory system having a controller and nonvolatile memory array, the method comprising:

prior to issuing for a component of the memory system a current command having a type, receiving at the controller a request for execution of such current command;

in response to receipt of the request for execution of the current command, the controller allowing the current command to issue and incrementing a count for the current command type and resetting a timer associated with the current command type if the count has not reached a predefined semaphore capacity;

in response to receipt of the request for execution of the current command, the controller withholding the current command from issuing if the count for such current command has reached the predefined semaphore capacity and the timer has not expired; and the controller resetting the count for such current command type if the timer for such current command type has expired.

2. The method of claim 1, wherein the component is a memory cell array and the current command type pertains to programming, reading or erasing with respect to the memory cell array.

3. The method of claim 1, wherein the count is reset by subtracting a timer expiration rate from the count.

4. The method of claim 3, wherein the expiration rate equals the semaphore capacity.

5. The method of claim 1, further comprising determining the type of the current command by comparing the current command to a plurality of command type values.

6. A memory system comprising:

a nonvolatile memory array for storing data;

a controller that is operable to perform the following operations:

prior to issuing for a component of the memory system a current command having a type, receiving a request for execution of such current command;

in response to receipt of the request for execution of the current command, allowing the current command to issue and incrementing a count for the current command type and resetting a timer associated with the current command type if the count has not reached a predefined semaphore capacity;

in response to receipt of the request for execution of the current command, withholding the current command from issuing if the count for such current command has reached the predefined semaphore capacity and the timer has not expired; and resetting the count for such current command type if the timer for such current command type has expired.

7. The memory system of claim 6, wherein the component is the nonvolatile memory array and the current command type pertains to programming, reading, or erasing with respect to the nonvolatile memory array.

8. The memory system of claim 6, wherein the count is reset by subtracting a timer expiration rate from the count.

9. The memory system of claim 8, wherein the expiration rate equals the semaphore capacity.

10. The memory system of claim 6, wherein the component is the a error correction module or an encryption engine of the controller and the current command type pertains to performing a command with respect to such error correction module or an encryption engine.

* * * * *

UNITED STATES PATENT AND TRADEMARK OFFICE
CERTIFICATE OF CORRECTION

| | | |
|---|---|---|
| PATENT NO. | : 8,745,369 B2 | Page 1 of 1 |
| APPLICATION NO. | : 13/296898 | |
| DATED | : June 3, 2014 | |
| INVENTOR(S) | : Damian P. Yurzola et al. | |

It is certified that error appears in the above-identified patent and that said Letters Patent is hereby corrected as shown below:

<u>In the Claims</u>

In column 12, claim 10, line 58, before "error correction module" delete "a".

Signed and Sealed this
Sixteenth Day of September, 2014

Michelle K. Lee
*Deputy Director of the United States Patent and Trademark Office*